Patented Feb. 6, 1923.

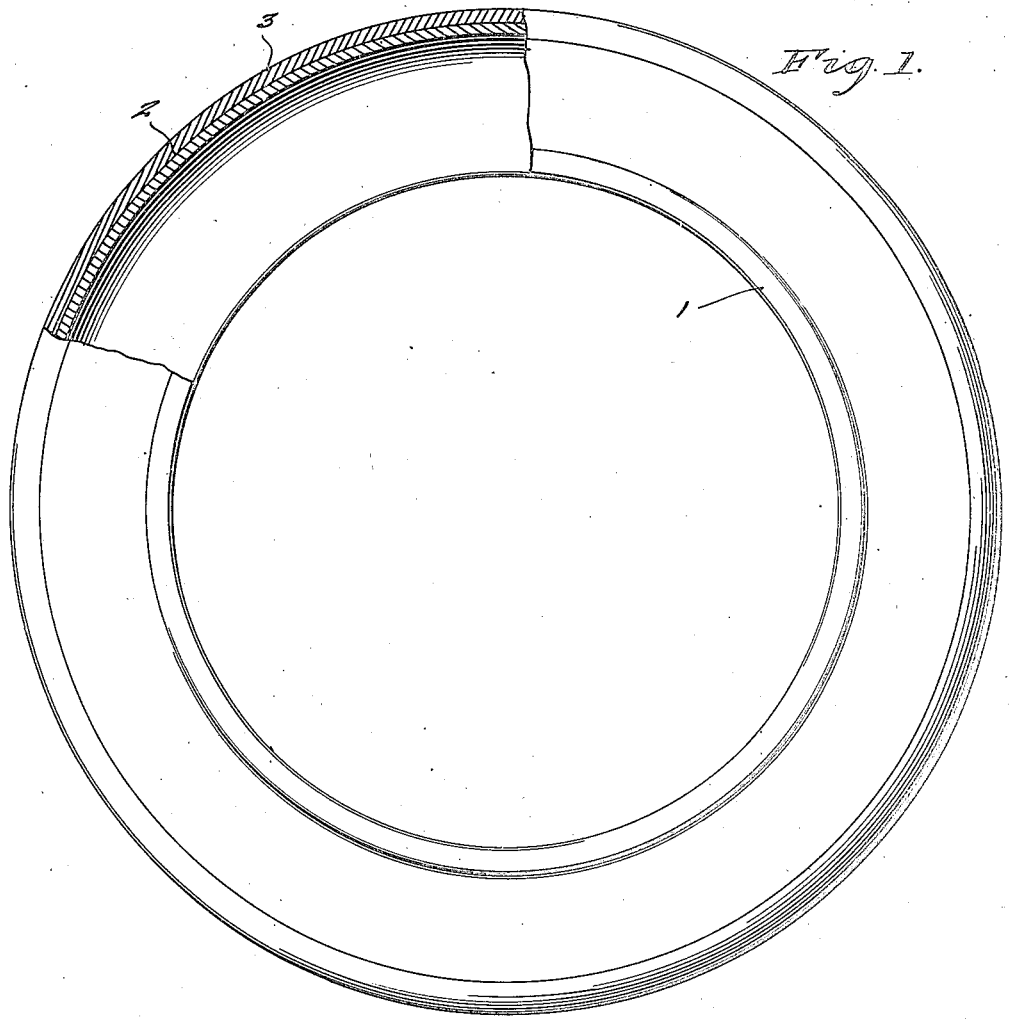
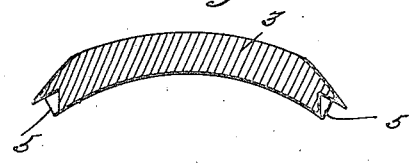

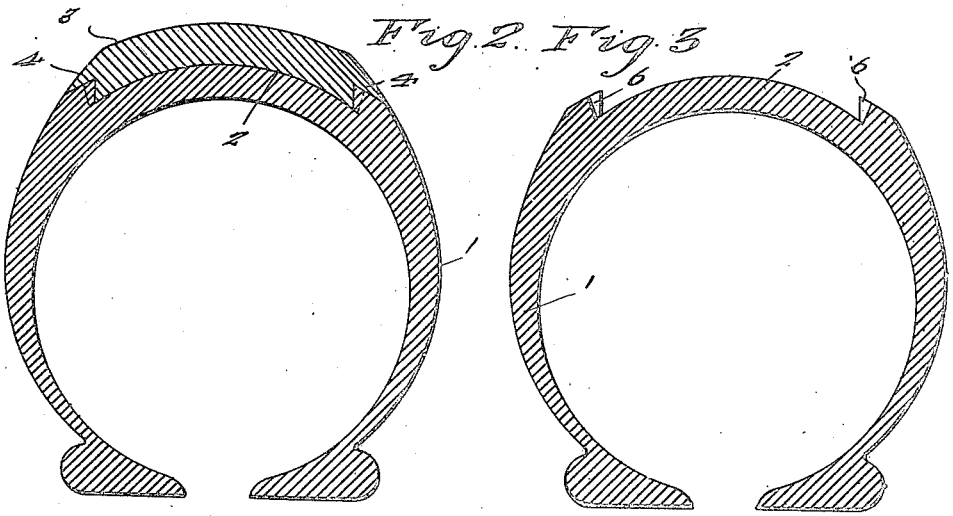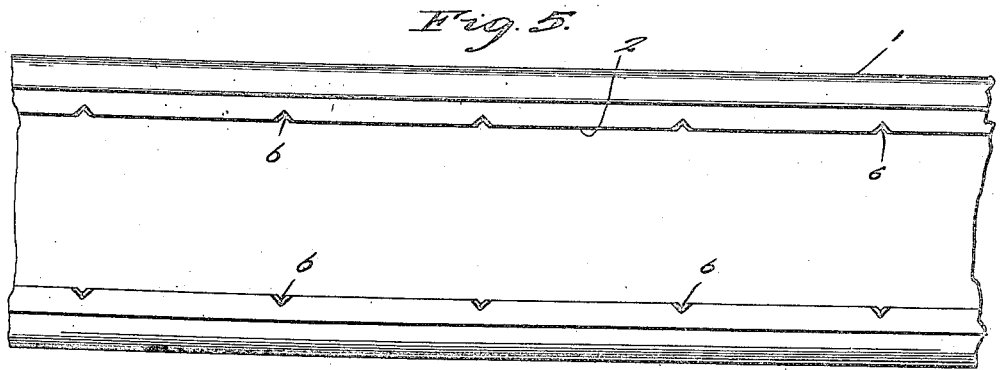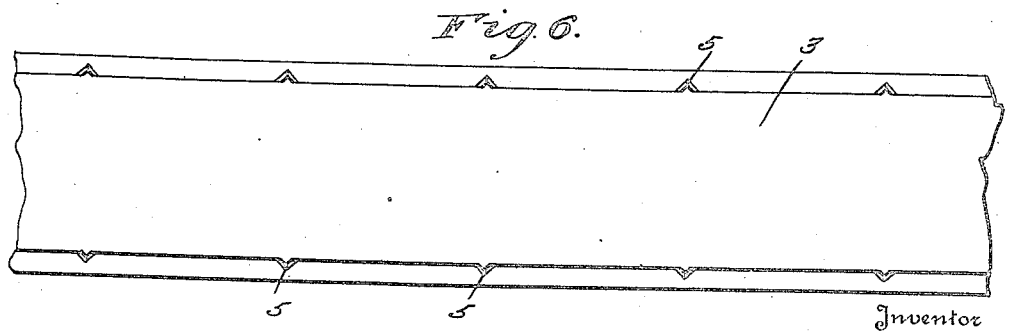

1,444,123

UNITED STATES PATENT OFFICE.

ORSON J. HUMPHREY, OF ELYRIA, OHIO.

TIRE CONSTRUCTION.

Application filed April 7, 1922. Serial No. 550,267.

*To all whom it may concern:*

Be it known that I, ORSON J. HUMPHREY, a citizen of the United States, residing at Elyria, in the county of Lorain and State of Ohio, have invented new and useful Improvements in Tire Constructions, of which the following is a specification.

In carrying out the present invention it is my purpose to provide a construction of pneumatic tire wherein the tread section may be detached from the body or carcass of the tire whenever the tread section has become worn and wherein such worn tread section may be replaced by a new tread. It is also my purpose to provide a construction of pneumatic tire wherein the tread section may be secured to the body portion or carcass of the tire in such manner as to eliminate creeping of the tread section on the carcass.

Furthermore I aim to provide a pneumatic construction which may be manufactured and marketed at small cost and wherein the tread section may be renewed as often as necessary without the expense of retreading as is now generally done and until the body portion or carcass of the tire is completely worn out.

With the above recited object in view and others of similar nature the invention resides in the construction, combination and arrangement of parts set forth in and falling within the scope of the appended claim.

In the accompanying drawings:—

Figure 1 is a side elevation of a pneumatic tire constructed in accordance with my invention, parts shown in section.

Figure 2 is a cross sectional view through the same, showing the removable tread section in position on the carcass.

Figure 3 is a similar view showing a tread section removed.

Figure 4 is a cross sectional view through the removable tread section.

Figure 5 is a plan view of the carcass showing the groove or channel therein.

Figure 6 is an inverted plan view of the removable tread section.

Referring to the drawings in detail, 1 designates the body portion or carcass of a pneumatic tire. This body portion or carcass is of the usual construction and, in accordance with my invention, the tread portion thereof is formed with a circumferential groove 2 and seated within the circumferential groove 2 and removable therefrom is a tread section 3, the outer surface of which may be either of the non-skid type or smooth.

The side edges of the removable section 3 project beyond the walls of the groove as at 4 and overlie the tread portion of the body 1 contiguous to the side walls of the groove 2 so as to protect such side walls and at the same time present an uneven broken surface thereby preventing sand, stones and the like from entering the groove between the body portion and the tread section.

The side edges of the section 3 are provided with laterally extending V-shaped lugs 5 below the overlapping portions 4 and these V-shaped lugs engage in V-shaped notches 6 formed in the walls of the groove 2.

These lugs and notches act to prevent creeping of the tread section 2 on the body 1 of the tire and lock the tread section to the body, and in the event of relative circumferential movement of the tread and body a wedging action will be set up between the V-shaped notches and the grooves, thereby eliminating the possibility of creeping of the tread on the body.

From the foregoing description taken in connection with the accompanying drawings, it will be seen that I have provided a tire and a removable tread section therefor which may be quickly detached from the body portion of the tire whenever it is necessary to renew the tread section, thereby prolonging the life of a tire as a whole and enabling the body portion to be completely worn out.

Having described my invention, what I claim and desire to secure by Letters-Patent, is:—

A tire comprising a carcass or body portion having a groove in the tread portion thereof and formed with V-shaped notches in the side walls of said groove, said notches opening into the groove and a tread portion in said groove removable therefrom and having the side edges thereof formed with laterally extending V-shaped lugs engageable in said notches respectively, whereby creeping of the tread sections around the body will be eliminated, and a wedging action set up in the event of relative circumferential movement of the tread and body, the side edges of said tread portion projecting beyond the walls of the groove and overlying said portion of the body contiguous to the side walls of the groove, so as to protect such side walls and present an uneven surface, whereby the entrance of foreign matter between the body portion and the tread section will be eliminated.

In testimony whereof, I affix my signature.

ORSON J. HUMPHREY.